Reissued May 21, 1940 Re. 21,454

UNITED STATES PATENT OFFICE 21,454

FIBROIN SPINNING SOLUTIONS

Rudolph S. Bley, Milligan College, Tenn., assignor to North American Rayon Corporation, New York, N. Y., a corporation of Delaware No Drawing. Original No. 2,145,855, dated February 7, 1939, Serial No. 59,912, January 20, 1936. Renewed April 19, 1938. Application for reissue March 16, 1939, Serial No. 262,234

16 Claims. (Cl. 106—38)

The present invention relates to a process of manufacturing solutions of proteins, such as fibroin, casein, gelatin, wool and alginic acid, from which the proteins may be precipitated by suitable reagents.

One object of this invention is to prepare a spinning solution containing a protein selected from the group consisting of silk fibroin, wool, gelatin, alginic acid and casein from which artificial products, such as filaments, yarns, ribbons, films, etc., may be formed.

Another object of my invention has to do with the preparation of a spinning solution by dissolving fibroin in a quaternary benzyl substituted ammonium base.

A third object of my invention relates to the manufacture of fibroin spinning solutions by dissolving a fibroin, such as natural silk, in a quaternary benzyl substituted ammonium hydroxide.

A fourth object of this invention has to do with the preparation of a spinning solution containing cellulose or cellulose derivatives and fibroin from which these substances may be precipitated in hydrated form.

Other objects of my invention will become apparent to those skilled in the art from a study of the following specification.

I am well aware that processes are already known for dissolving silk fibroin in ammoniacal copper hydroxide, etc., to produce spinning solutions therefrom. However, such solutions have proven unstable due to degradation of the fibroin molecule, this degradation resulting in a decrease in viscosity of such fibroin solutions. In accordance with the present invention this degradation of the fibroin molecule is substantially counteracted by dissolving natural silk in solutions of quaternary benzyl substituted ammonium bases. I have found by experimentation that fibroin may be rapidly and completely dissolved in high-molecular organic ammonium bases having the general structure

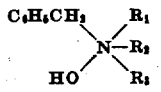

in which $R_1$, $R_2$ and $R_3$ represent alkyl, aryl and/or aralkyl groups or substituted derivatives thereof. In addition, I have found that benzyl substituted, quaternary ammonium hydroxides are especially suitable for dissolving fibroin, wool, etc., to form spinning solutions. Although I have found that trimethyl - benzyl - ammonium hydroxide is an excellent solvent for fibroin, wool, etc., other quaternary benzyl-ammonium hydroxides may be used for this purpose, such as triethyl-benzyl-ammonium hydroxide, dimethyl-phenyl - benzyl - ammonium hydroxide, diethyl-phenyl - benzyl - ammonium hydroxide, dibutyl-phenyl - benzyl - ammonium hydroxide, dimethyl-tolyl-benzyl-ammonium hydroxide, dimethyl - amyl - benzyl - ammonium hydroxide, dimethyl-dibenzyl-ammonium hydroxide, benzyl-pyridonium hydroxide, dibutyl-dibenzyl-ammonium hydroxide, tolyl-pyridonium hydroxide, etc. In other words, I may use any water-soluble high-molecular quaternary ammonium hydroxide which has a strong basic reaction and which is able to dissolve fibroin, wool, cellulose, etc. Benzyl substituted ammonium hydroxides are able to dissolve such substances in relatively short periods of time to form clear, filtrable solutions. The fibroin can be precipitated from such solutions by diluting them with water or by causing the ammonium base to react with acids, acid salts and the like. However, it is to be noted that aqueous solutions of benzyl substituted ammonium hydroxides should be preferably of about 25 to 50% strength, i. e., about 2 normal. It is also preferable to dissolve fibroin in quaternary ammonium bases at an elevated temperature for the formation of clear filtrable solutions. However, care must be exercised to avoid decomposition by the solvent by raising the temperature too high. Although it has been found that such fibroin solutions keep well on standing at ordinary room temperature, the degradation of fibroin may be practically overcome by storing said solutions at a low temperature. The solutions may be diluted to some extent with water without causing precipitation of fibroin provided suitable emulsifying agents, such as trimethyl-benzyl-ammonium oleate, alkali metal salts of fatty acids, etc., are added thereto in suitable proportions.

Any known type of delustering agent which is stable in quaternary ammonium bases, such as oils, pigments, dyestuffs, etc., may be dispersed by suitable means in these fibroin solutions for the production of soft-lustre or colored products therefrom.

Instead of using a fibroin solution per se for the production of filaments, yarns, films, etc., I may form mixed spinning solutions containing for example fibroin and cellulose, since both substances may be dissolved in quaternary ammonium hydroxides For this purpose, I may dissolve for example natural silk and cellulose or a cellulose derivative, such as cellulose esters and ethers in a concentrated, aqueous solution of a benzyl substituted ammonium hydroxide such as trimethyl-benzyl ammonium hydroxide, etc. The fibroin-cellulose or fibroin-cellulose derivative solution may be subsequently spun into water, dilute acids or salt solutions to form filaments, yarns, ribbons or films. Solutions may also be spun containing fibroin, cellulose and a rubber latex. The solutions, set forth above, may be spun in funnels like cuprammonium cellulose or they may be precipitated and coagulated like viscose in setting baths. The coagulated products may be collected on spools or in centrifugal pots. Cellulose sponges may be formed in molds in well-known manner. Any known delustering agent which is stable in quaternary benzyl substituted ammonium bases may be added in suitable amounts to fibroin, fibroin-cellulose, fibroin-cellulose derivative or fibroin-wool or mixtures thereof to modify the lustre and other physical characteristics of the finished products. The ammonium bases may be recovered from the setting baths by suitable means and re-employed for the dissolution of fibroin, cellulose, wool, etc., to render the process more economical.

*Example I*

Natural silk, i. e., fibroin, is dissolved at a moderate temperature in a 25 to 50% solution of trimethyl-benzyl ammonium hydroxide until a solution of sufficient viscosity is obtained. The spinning solution, thus prepared, is spun with the assistance of spinnerettes into an acid setting bath containing for example dilute sulphuric acid and sodium sulphate. The threads are collected on spools or in pots, washed and dried. Wool, gelatin, alginic acid or casein may be dissolved in similar manner to form solutions which are spun like silk fibroin.

*Example II*

Natural silk and cellulose are dissolved together in a quaternary ammonium hyroxide, preferably trimethyl-benzyl ammonium hydroxide, and spun as set forth in Example I. Instead of cellulose or regenerated cellulose, a cellulose derivative, i. e., esters and ethers, may be dissolved together with fibroin. Instead of forming silk fibroin solutions, I may dissolve wool, gelatin, alginic acid or casein in a quaternary ammonium base, preferably a benzyl substituted ammonium hydroxide, to form spinning solutions which may contain in addition cellulose, regenerated cellulose or cellulose derivatives.

*Example III*

Fibroin, wool, gelatin, alginic acid or casein solutions with or without cellulose additions are diluted with water after the addition of a suitable emulsifying agent, such as trimethyl-benzyl oleate to such extent that the solid phase is not precipitated, spun and after-treated in accordance with the methods set forth above.

Instead of feeding the spinning solutions, set forth above, singly to the spinning nozzles, I may extrude for example a fibroin solution together with a cellulose solution from a single or a plurality of spinnerettes and obtain composite products consisting of natural silk and cellulose filaments, etc. In this manner, I may also produce mixed products consisting of natural silk, wool and cellulose, etc. Furthermore, I may admix pigments or other solid and liquid delustrants with my spinning solutions for the production of yarns composed of differently colored filaments, etc. In other words, according to the present invention, any method known in the rayon art may be used to modify the physical properties of products manufactured from my novel spinning solutions. Instead of completely dissolving the carbohydrates in benzyl substituted quaternary ammonium hydroxide, they may be pretreated therewith and subsequently xanthated with carbon bisulphide to form solutions from which artificial silk may be spun. I wish to emphasize that the substances, set forth above, may be truly dissolved in the qaternary ammonium hydroxides or merely finely dispersed therein.

Modifications of my invention will readily be recognized by those skilled in the art, and I desire to include all such modifications coming within the scope of the appended claims.

I claim:

1. A spinning solution for the manufacture of artificial products comprising a protein selected from the group consisting of silk fibroin, wool, gelatin, alginic acid and casein finely dispersed in a quaternary benzyl substituted ammonium base having the structure

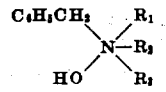

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals, said solution having the property of substantially retaining its viscosity on standing for relatively long periods of time at a temperature not exceeding ordinary room temperatures.

2. A spinning solution for the manufacture of artificial products comprising a casein finely dispersed in a quaternary benzyl substituted ammonium base having the structure

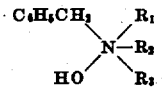

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals, said solution having the property of substantially retaining its viscosity on standing for relatively long periods of time at a temperature not exceeding ordinary room temperatures.

3. A spinning solution for the manufacture of artificial products comprising an alginic acid finely dispersed in a quaternary benzyl substituted ammonium base having the structure

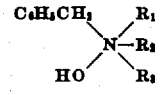

in which $R_1$, $R_2$ and $R_3$ represents a radical selected from the group consisting of alkyl radicals, aryl radicals, aralkyl radicals, substituted alkyl radicals, substituted aryl radicals and substituted aralkyl radicals, said solution having the property of substantially retaining its viscosity on standing for relatively long periods of time at a temperature not exceeding ordinary room temperatures.

4. A spinning solution for the manufacture of artificial products comprising a protein selected from the group consisting of silk fibroin, wool, gelatin, alginic acid and casein finely dispersed in a trimethyl-benzyl-ammonium hydroxide, said solution having the property of substantially retaining its viscosity on standing for relatively long periods of time at a temperature not exceeding ordinary room temperatures.

5. A spinning solution for the manufacture of artificial products comprising a silk fibroin finely dispersed in a trimethyl-benzyl-ammonium hydroxide, said solution having the property of substantially retaining its viscosity on standing for relatively long periods of time at a temperature not exceeding ordinary room temperatures.

6. A spinning solution for the manufacture of artificial products comprising a casein finely dispersed in a trimethyl-benzyl-ammonium hydroxide, said solution having the property of substantially retaining its viscosity on standing for relatively long periods of time at a temperature not exceeding ordinary room temperatures.

7. A spinning solution for the manufacture of artificial products comprising an alginic acid finely dispersed in a trimethyl-benzyl-ammonium hydroxide, said solution having the property of retaining its viscosity on standing for relatively long periods of time at a temperature not exceeding ordinary room temperatures.

8. A spinning solution for the manufacture of artificial products comprising a protein selected from the group consisting of silk fibroin, wool, gelatin, alginic acid and casein finely dispersed in a quaternary benzyl substituted ammonium base having the structure

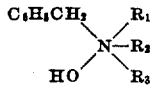

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals together with a cellulosic substance selected from the group consisting of cellulose, cellulose esters and cellulose ethers, said solution having the property of substantially retaining its viscosity on standing for relatively long periods of time at a temperature not exceeding ordinary room temperatures.

9. A spinning solution for the manufacture of artificial products comprising a silk fibroin finely dispersed in a quaternary benzyl substituted ammonium base having the structure

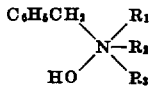

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals, together with a cellulosic substance selected from the group consisting of cellulose, cellulose esters and cellulose ethers, said solution having the property of substantially retaining its viscosity on standing for relatively long periods of time at a temperature not exceeding ordinary room temperatures.

10. A spinning solution for the manufacture of artificial products comprising a casein finely dispersed in a quaternary benzyl substituted ammonium base having the structure

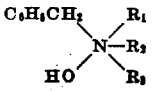

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals together with a cellulosic substance selected from the group consisting of cellulose, cellulose esters and cellulose ethers, said solution having the property of substantially retaining its viscosity on standing for relatively long periods of time at a temperature not exceeding ordinary room temperatures.

11. A spinning solution for the manufacture of artificial products comprising an alginic acid finely dispersed in a quaternary benzyl substituted ammonium base having the structure

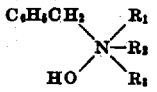

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals together with a cellulosic substance selected from the group consisting of cellulose, cellulose esters and cellulose ethers, said solution having the property of substantially retaining its viscosity on standing for relatively long periods of time at a temperature not exceeding ordinary room temperatures.

12. A spinning solution for the manufacture of artificial products comprising a protein selected from the group consisting of silk fibroin, wool, gelatin, alginic acid and casein finely dispersed in a trimethyl-benzyl-ammonium hydroxide together with a cellulosic substance selected from the group consisting of cellulose, cellulose esters and cellulose ethers, said solution having the property of substantially retaining its viscosity on standing for relatively long periods of time at a temperature not exceeding ordinary room temperatures.

13. A spinning solution for the manufacture of artificial products comprising a silk fibroin finely dispersed in a trimethyl-benzyl-ammonium hydroxide together with a cellulosic substance selected from the group consisting of cellulose, cellulose ethers and cellulose esters, said solution having the property of substantially retaining its viscosity on standing for relatively long periods of time at a temperature not exceeding ordinary room temperatures.

14. A spinning solution for the manufacture of artificial products comprising a casein finely dispersed in a trimethyl-benzyl-ammonium hydroxide together with a cellulosic substance selected from the group consisting of cellulose, cellulose ethers and cellulose esters, said solution having the property of substantially retaining its viscosity on standing for relatively long periods of time at a temperature not exceeding ordinary room temperatures.

15. A spinning solution for the manufacture of artificial products comprising an alginic acid finely dispersed in a trimethyl-benzyl-ammonium hydroxide together with a cellulosic substance selected from the group consisting of cellulose, cellulose ethers and cellulose esters, said solution having the property of substantially retaining its viscosity on standing for relatively long periods of time at a temperature not exceeding ordinary room temperatures.

16. A spinning solution for the manufacture of artificial products comprising a silk fibroin finely dispersed in a quaternary benzyl substituted ammonium base having the structure

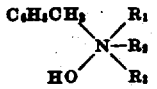

in which $R_1$, $R_2$ and $R_3$ represent a radical selected from the group consisting of alkyl radicals, aryl radicals, aralkyl radicals, substituted alkyl radicals, substituted aryl radicals and substituted aralkyl radicals, said solution having the property of substantially retaining its viscosity on standing for relatively long periods of time at a temperature not exceeding ordinary room temperatures.

RUDOLPH S. BLEY.